United States Patent
Schroeder

(10) Patent No.: US 7,093,801 B2
(45) Date of Patent: Aug. 22, 2006

(54) POSITIONING SYSTEM, DEVICE, AND METHOD FOR IN-FLIGHT REFUELING

(75) Inventor: Steven B. Schroeder, Derby, KS (US)

(73) Assignee: The Boeing Company, Chicago, IL (US)

(*) Notice: Subject to any disclaimer, the term of this patent is extended or adjusted under 35 U.S.C. 154(b) by 123 days.

(21) Appl. No.: 10/857,226

(22) Filed: May 28, 2004

(65) Prior Publication Data

US 2006/0000949 A1   Jan. 5, 2006

(51) Int. Cl.
*B64D 39/00* (2006.01)

(52) U.S. Cl. .................................. 244/135 A; 701/302

(58) Field of Classification Search ............ 244/135 R, 244/135 A, 136, 1 R, 172.4, 161; 342/63; 701/302
See application file for complete search history.

(56) References Cited

U.S. PATENT DOCUMENTS

| 3,285,544 | A | * | 11/1966 | Chope et al. | ............ 244/135 A |
| 4,158,885 | A | * | 6/1979 | Neuberger | .................. 701/300 |
| 5,539,624 | A | * | 7/1996 | Dougherty | .................. 362/556 |
| 6,819,982 | B1 | * | 11/2004 | Doane | ........................... 701/3 |

OTHER PUBLICATIONS

The NASA Dryden Flight Test Approach to an Aerial Refueling System, http://dtrs.dfrc.nasa.gov/archive/00000399/01/212859.pdf.*
Autonomous Formation Flight, http://ocw.mit.edu/NR/rdonlyres/Aeronautics-and-Astronautics/16-886Spring2004/9B31A332-EA04-44D1-BA85-5A83ECE07F4F/0/02_greg_larson1.pdf.*
Starscope at sea, vol. 1, No. 20, Mar. 14, 1994, (automated landing and also applications with aerial refueling).*
http://science.howstuffworks.com/aircraft-carrier.htm/printable, light guidance and "split beam".*

* cited by examiner

Primary Examiner—Peter M. Poon
Assistant Examiner—T D Collins
(74) Attorney, Agent, or Firm—Alston & Bird LLP

(57) ABSTRACT

A positioning system, device, and method are provided to facilitate the in-flight positioning of two aircraft relative to one another such that a second aircraft is guided to an in-flight refueling position relative to a first aircraft. The system, device, and method of the present invention provide a signal emitted from a positioning device carried by the first aircraft, wherein the signal defines a signal envelope containing the in-flight refueling position. The signal is adapted to be receivable by the second aircraft such that the signal may guide the second aircraft to the in-flight refueling position relative to the first aircraft.

13 Claims, 7 Drawing Sheets

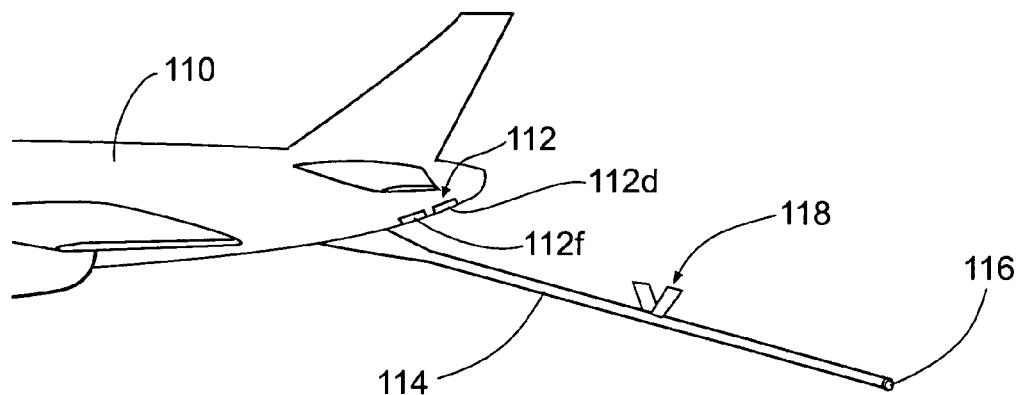
*FIG. 5*
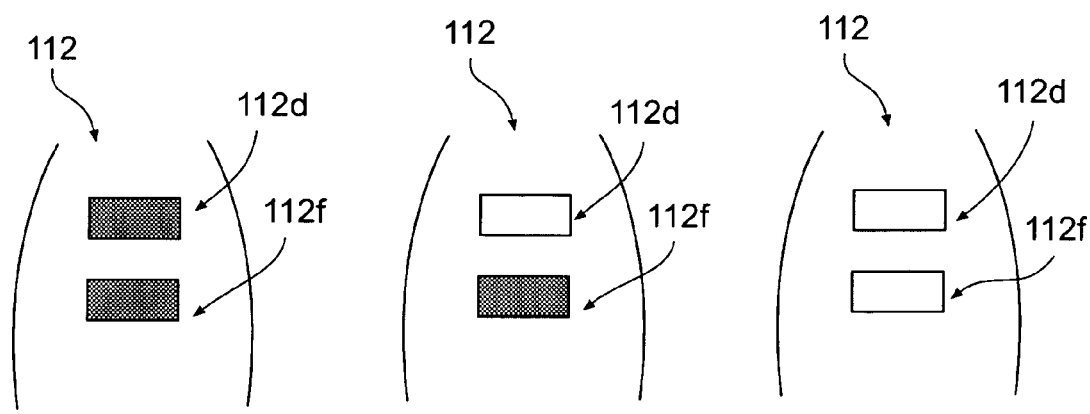
*FIG. 5A*  *FIG. 5B*  *FIG. 5C*

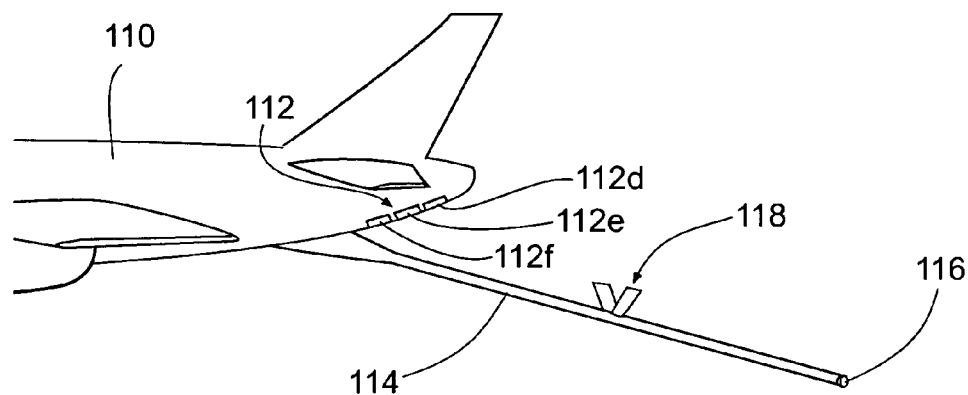
*FIG. 6*
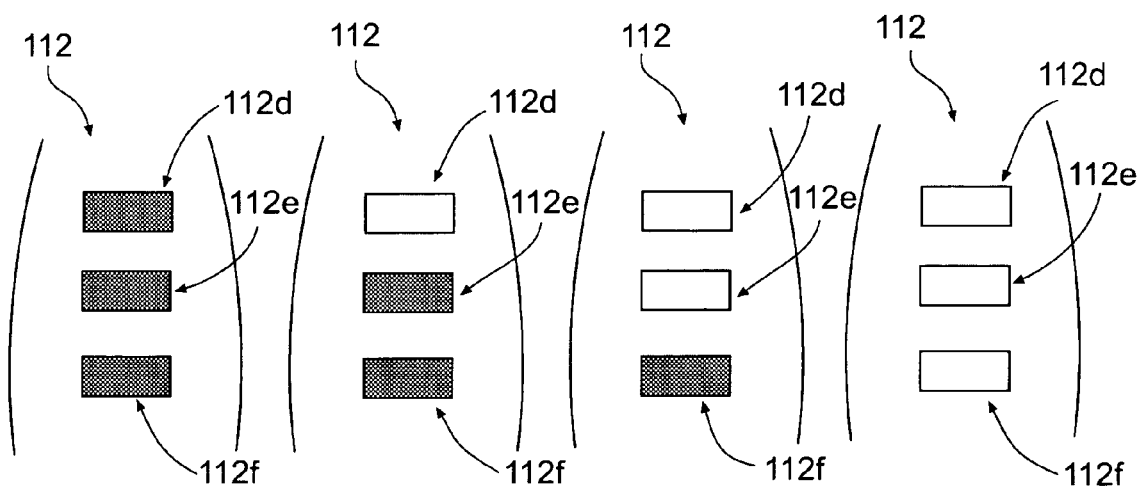
*FIG. 6A*　　*FIG. 6B*　　*FIG. 6C*　　*FIG. 6D*

POSITIONING SYSTEM, DEVICE, AND METHOD FOR IN-FLIGHT REFUELING

FIELD OF THE INVENTION

The present invention relates generally to in-flight refueling, and specifically, providing optical and/or electronic positioning devices on a first aircraft so as to provide guidance to a manned or unmanned second aircraft such that the first and second aircraft may be spatially positioned, relative to one another, for in-flight refueling.

BACKGROUND OF THE INVENTION

In-flight refueling (or air-to-air refueling) is an important method for extending the range of aircraft traveling long distances over areas having no feasible landing or refueling points. Although in-flight refueling is a relatively common operation, especially for military aircraft, precise positioning of a second aircraft (the receiver aircraft, for example) with respect to a first aircraft (the tanker aircraft, for example) is required in order to provide a safe engagement of the first aircraft with the second aircraft for the dispensing of fuel. The requirement of precise relative spatial positioning of two rapidly moving aircraft, makes in-flight refueling a challenging operation.

There are currently two primary systems for in-flight refueling. One system is the boom refueling system. The boom refueling system typically comprises a rigid boom extended from a refueling aircraft. At one end of the boom is a refueling nozzle and adjacent the refueling nozzle are airfoils, which are controlled by a boom operator on the refueling aircraft. The airfoils provide maneuverability of the boom with respect to an aircraft that is to be refueled. For the aircraft that is to be refueled, the second aircraft, the operator of the second aircraft must maneuver the second aircraft to within an in-flight refueling position, below and aft of the first aircraft. Upon maneuvering into the in-flight refueling position, the boom operator controls the airfoils to position and mate the boom into a refueling connection on the second aircraft.

Another type of refueling system is the probe and drogue system. In the probe and drogue system, a refueling hose having a drogue disposed on one end is trailed behind first aircraft (the tanker aircraft). The second aircraft has a probe that is flown by its operator into the drogue. As the drogue typically moves away from the second aircraft as it approaches, great skill and maneuvering ability is required by the operator of the second aircraft to mate the probe with the drogue. It is preferable, in the probe and drogue system, for the second aircraft to approach and enter the in-flight refueling position relative to the first aircraft as in the boom system, except in this case, the operator of the second aircraft is also responsible for "flying" the second aircraft's probe directly into the trailing drogue, because the drogue lacks the control surfaces that are provided on the refueling boom.

Thus, for both types of in-flight refueling systems, the operator of the second aircraft must maneuver the second aircraft to the in-flight refueling position (IFRP) and maintain the second aircraft's position in the IFRP relative to the first aircraft for the duration of the fueling operation. The approach and positioning of the second aircraft must be precise in order to avoid potentially dangerous areas of air turbulence that may be created in the wake of the first aircraft by, for instance, the first aircraft's engines and control surfaces. To avoid areas of potential turbulence, the second aircraft, in many cases, approaches the first aircraft from the aft and from below so that it intercepts the IFRP as described more fully herein. Thus, a positioning system for guiding a second aircraft to the IFRP relative to a first aircraft is needed.

Optical systems have been disclosed for positioning refueling drogues with respect to refueling probes attached to receiver aircraft. As refueling drogues, however, have proven relatively unmaneuverable, these systems have not been operationally viable. One such optical system is described in U.S. Pat. No. 5,326,052 to Krispin et al. Other optical systems for positioning objects with respect to reflectors and retro-reflectors have not been easily adapted for use in all types of in-flight refueling systems. In addition, optical landing aids, such as visual approach slope indicator (VAST) systems, are useful for providing optical glide slope information for aircraft approaching a fixed runway, however such systems have not yet been successfully adapted to position two moving objects relative to each other. Also, radio-signal positioning systems, such as the instrument landing system (ILS), provide radio signals to laterally position aircraft approaching a fixed runway along a suitable approach glide slope, but such systems are also not tailored for use in situations where the positioning device is located on a moving aircraft, nor where an upward glide slope is required to guide a second aircraft up and forward into the IFRP relative to a first aircraft (such as a tanker aircraft).

Therefore, there exists a need for an in-flight refueling positioning system that provides a positioning device to guide a second aircraft into the in-flight refueling position with respect to a first aircraft. This need extends to in-flight refueling operations using both a boom in-flight refueling system and a probe and drogue in-flight refueling system. There also exists a need for a positioning system that is compatible with receiver devices sometimes installed in the second aircraft and using a signal that may be recognizable by an operator of the second aircraft. There also exists a need for an in-flight refueling positioning system that is functional in an in-flight refueling operation taking place at night or in inclement weather.

SUMMARY OF THE INVENTION

The embodiments of the present invention satisfy the needs listed above and provide other advantages as described below. The present invention provides a positioning system, apparatus, and method adapted to facilitate the in-flight spatial positioning of a first aircraft with respect to a second aircraft. The positioning system comprises a positioning device carried by the first aircraft that is configured to provide a signal adapted to be receivable by the second aircraft. The signal is further adapted to guide the second aircraft to an in-flight refueling position relative to the first aircraft.

According to other advantageous embodiments, the present invention may further comprise a receiver device, carried by the second aircraft, wherein the receiver device is configured to be responsive to the signal so as to guide the second aircraft to the in-flight refueling position. In some embodiments, the signal may further comprise glide slope information adapted to guide the second aircraft to the in-flight refueling position. According to some embodiments, the signal provided by the positioning device may further comprise: radio signals, visual indicia, visible light, and/or other visual or electronic signal types suitable to serve as refueling guidance signals.

The embodiments of the present invention also provide a method for facilitating the in-flight spatial positioning of a first aircraft with respect to a second aircraft. According to some advantageous embodiments the method comprises the steps of: sending a signal from a positioning device carried by the first aircraft, the positioning device being configured such that the signal it sends is receivable by the second aircraft, and guiding the second aircraft, in response to the signal, to an in-flight refueling position relative to the first aircraft.

Advantages provided by embodiments of the present invention may include, but are not limited to, the ability to accurately guide the second aircraft into the in-flight refueling position relative to the first aircraft in clear visibility conditions as well as reduced visibility conditions, including darkness or inclement weather. Other advantages include the ability to provide signals to the operator of the second aircraft that are similar to signals provided to aircraft operators in other aviation operations, such as landing an aircraft along an optimal glide path using the Instrument Landing System (ILS). Embodiments of the present invention also provide the advantage of improving the safety and efficiency of in-flight refueling operations in all conditions by guiding the second aircraft along a safe intercept route, such as an upward glide slope, to an in-flight refueling position relative to the first aircraft.

These advantages and others that will be evident to those skilled in the art are provided in the positioning system, device, and method of the present invention.

BRIEF DESCRIPTION OF THE DRAWINGS

Figure 1:
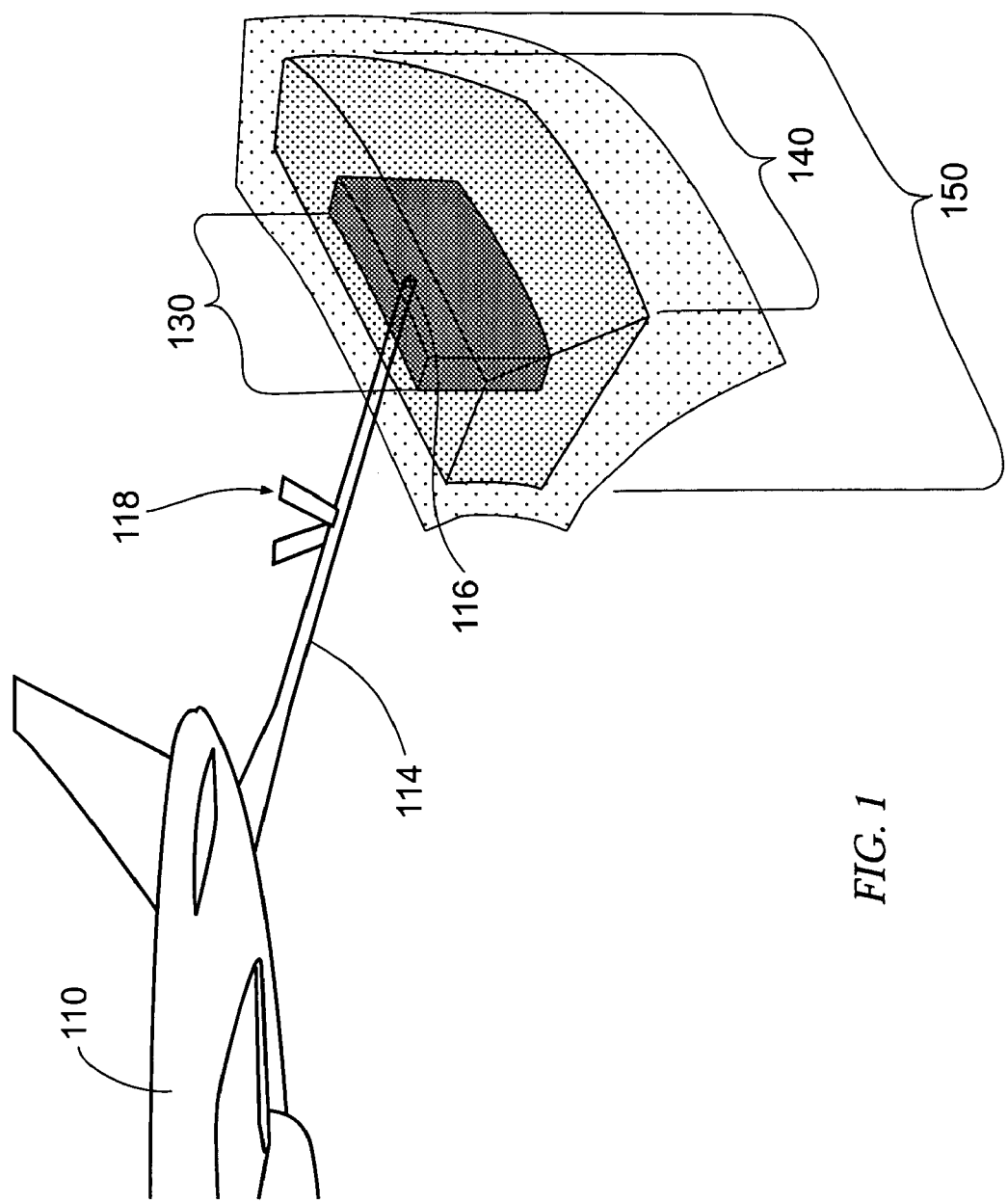
Figure 2:
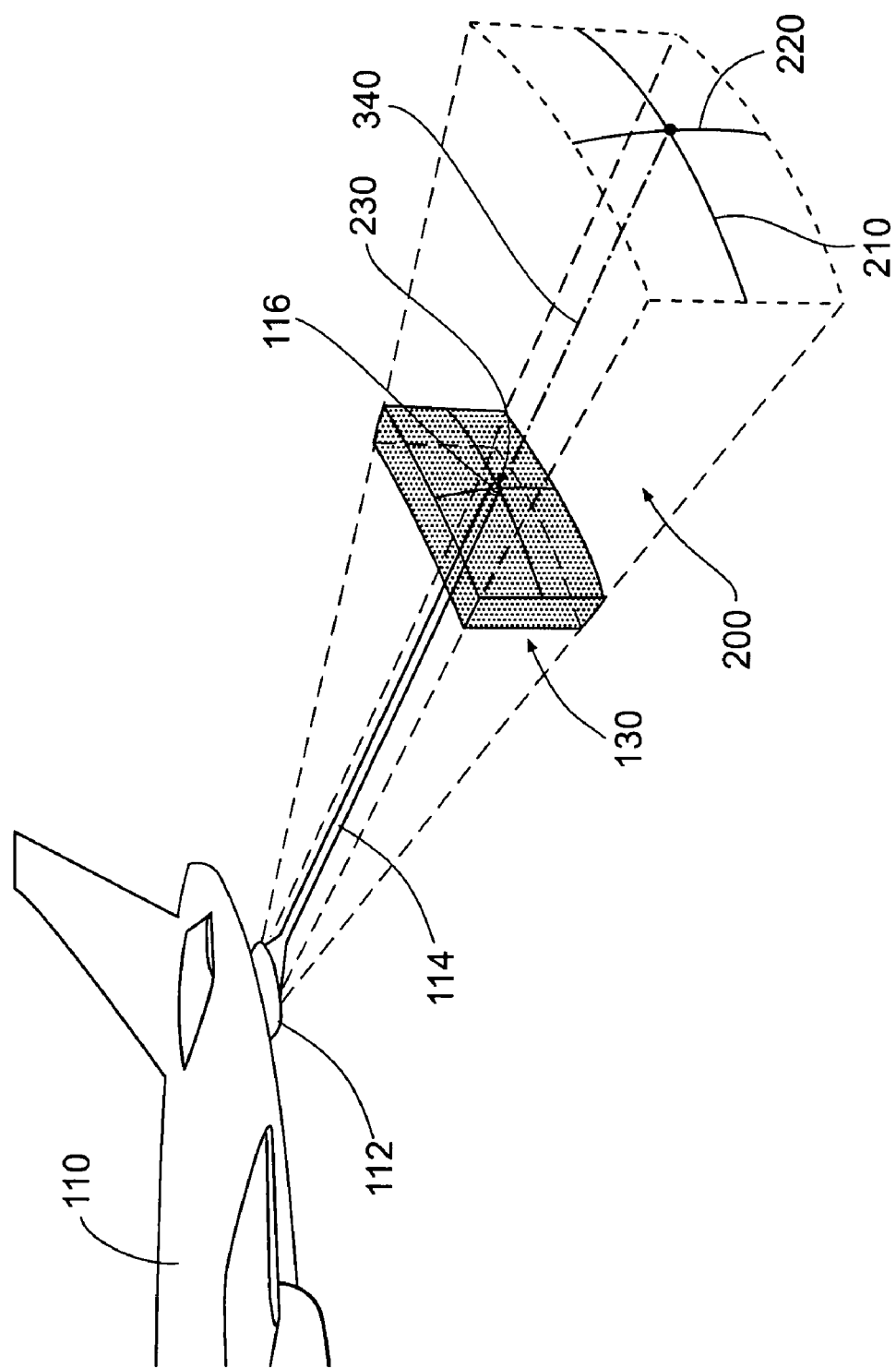
Figure 3A:
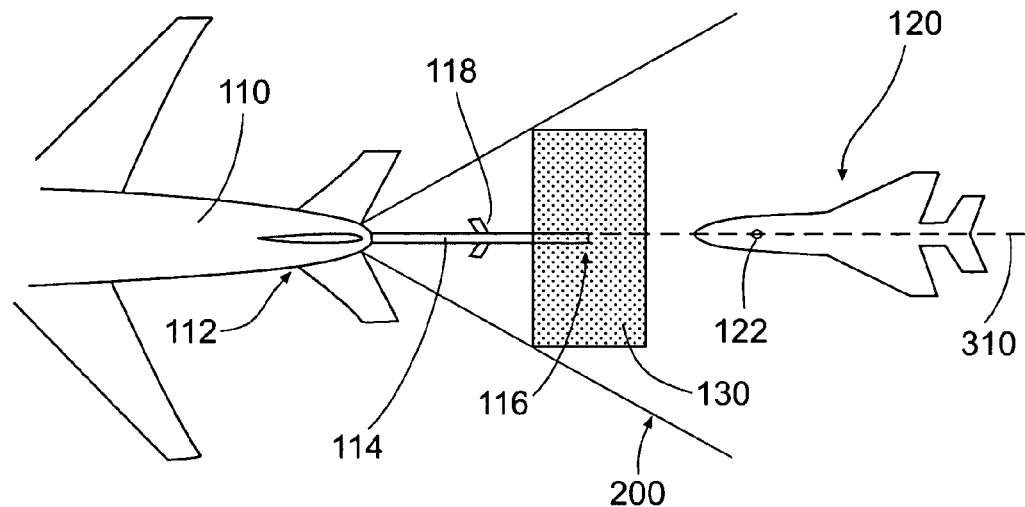
Figure 3B:
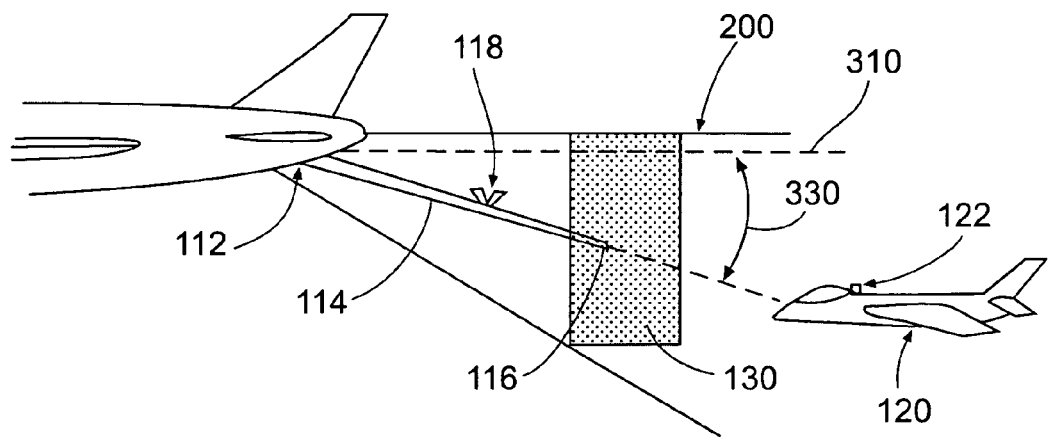
Figure 4:
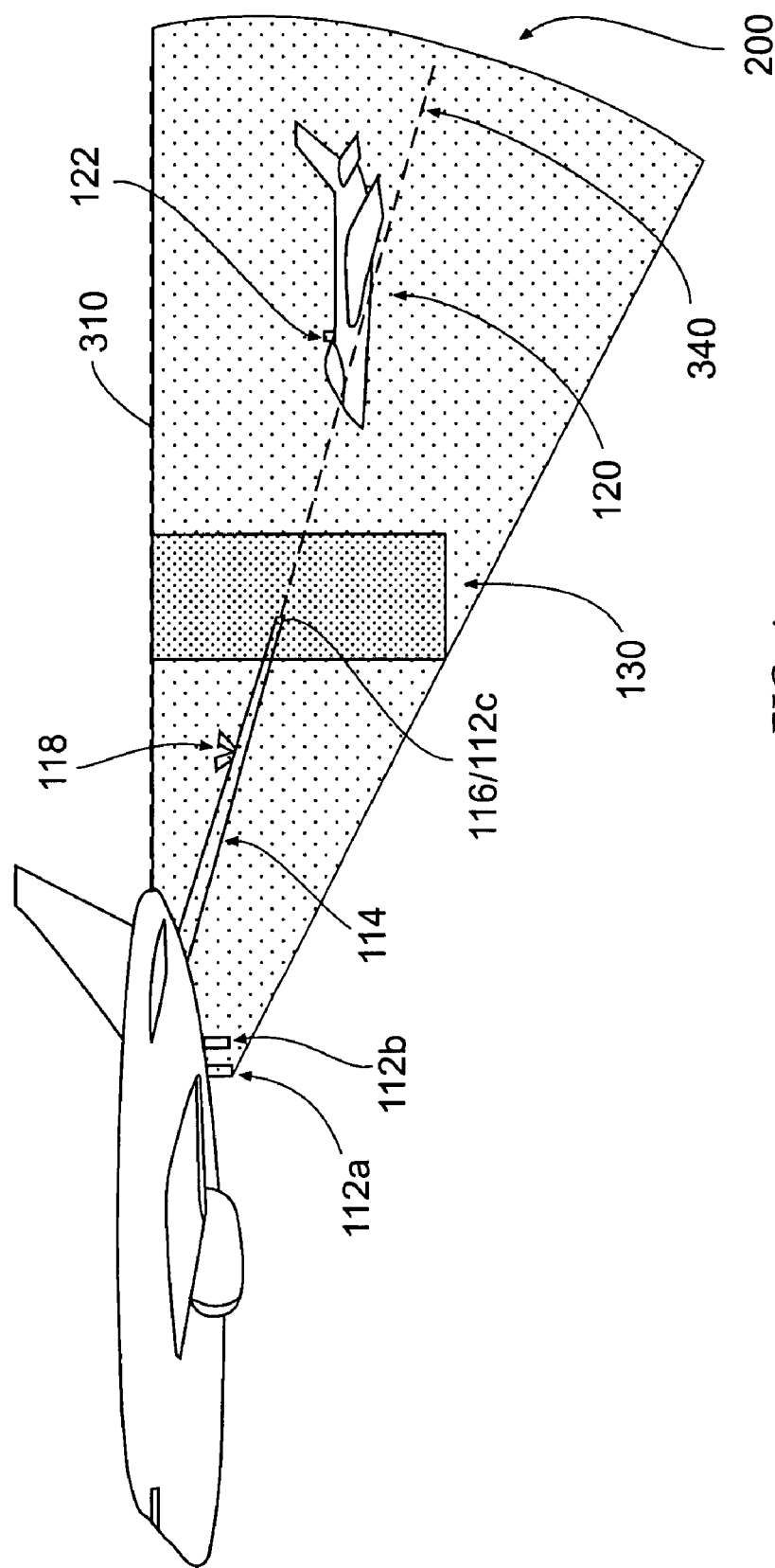
Figure 4A:
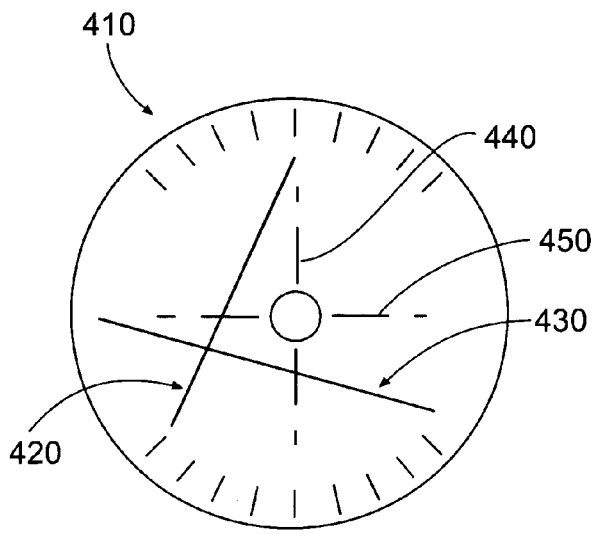
Figure 4C:
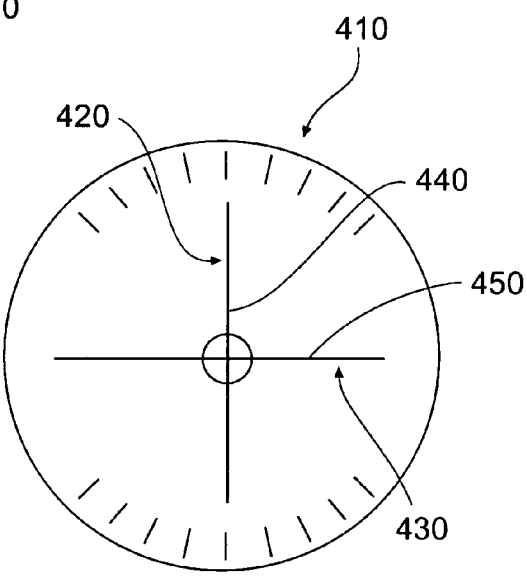
Figure 4B:
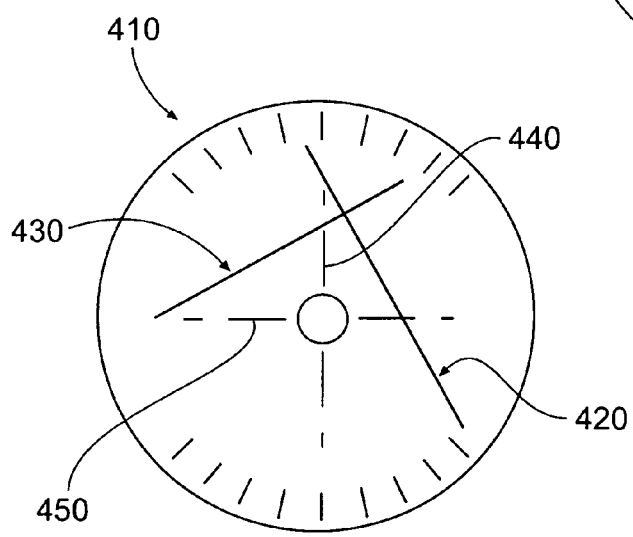

Having thus described the invention in general terms, reference will now be made to the accompanying drawings, which are not necessarily drawn to scale, and wherein:

FIG. 1 is a schematic of the in-flight refueling position, disconnect limits, and mechanical limits of an in-flight refueling operation with respect to a first aircraft, serving as the tanker aircraft;

FIG. 2 is a schematic of the in-flight refueling position superimposed upon the signal envelope provided by the positioning device carried by a first aircraft, serving as a tanker aircraft, according to one embodiment of the present invention;

FIG. 3a is a top view of the in-flight refueling position superimposed upon a schematic showing the first aircraft relative to the second aircraft as the second aircraft approaches the in-flight refueling position;

FIG. 3b is a side view of the in-flight refueling position superimposed upon a schematic showing the first aircraft relative to the second aircraft as the second aircraft approaches the in-flight refueling position;

FIG. 4 is a side view of an in-flight refueling positioning system according to one embodiment of the invention wherein the signal comprises refueling guidance signals produced by a positioning device further comprising first, second, and third guiding devices carried by the first aircraft;

FIG. 4a is a schematic of a receiver device further comprising a display configured to provide two visual indicia in response to a refueling guidance signal emitted by the guiding devices, wherein the visual indicia are guiding the operator of the second aircraft to guide the second aircraft left and downward to intercept the in-flight refueling position;

FIG. 4b is a schematic of a receiver device further comprising a display configured to provide two visual indicia in response to a refueling guidance signal emitted by the guiding devices, wherein the visual indicia are guiding the operator of the second aircraft to guide the second aircraft right and upward to intercept the in-flight refueling position;

FIG. 4c is a schematic of a receiver device further comprising a display configured to provide two visual indicia in response to a refueling guidance signal emitted by the guiding devices, wherein the visual indicia are indicating that the operator of the second aircraft is in position to intercept the in-flight refueling position;

FIG. 5 shows a schematic of one embodiment of the positioning device comprising two lighting units attached to the lower rear fuselage of the first aircraft;

FIG. 5a shows a positioning device comprising two lighting units (far and near) as viewed by the second aircraft, according to one embodiment of the positioning system of the present invention, wherein the lighting units indicate that the second aircraft is above the glide slope required to intercept the in-flight refueling position;

FIG. 5b shows a positioning device comprising two lighting units (far and near) as viewed by the second aircraft, according to one embodiment of the positioning system of the present invention, wherein the lighting units indicate that the second aircraft is on the glide slope required to intercept the in-flight refueling position;

FIG. 5c shows a positioning device comprising two lighting units (far and near) as viewed by the second aircraft, according to one embodiment of the positioning system of the present invention, wherein the lighting units indicate that the second aircraft is below the glide slope required to intercept the in-flight refueling position;

FIG. 6 shows a schematic of the one embodiment of the positioning device comprising three lighting units attached to the lower rear fuselage of the first aircraft;

FIG. 6a shows a positioning device comprising three lighting units (far, middle, and near) as viewed by the second aircraft, according to one embodiment of the positioning system of the present invention, wherein the lighting units indicate that the second aircraft is above the glide slopes required to intercept the in-flight refueling position;

FIG. 6b shows a positioning device comprising three lighting units (far, middle, and near) as viewed by the second aircraft, according to one embodiment of the positioning system of the present invention, wherein the lighting units indicate that the second aircraft is on an upper glide slope required to intercept the in-flight refueling position;

FIG. 6c shows a positioning device comprising three lighting units (far, middle, and near) as viewed by the second aircraft, according to one embodiment of the positioning system of the present invention, wherein the lighting units indicate that the second aircraft is on a lower glide slope required to intercept the in-flight refueling position; and FIG. 6d shows a positioning device comprising three lighting units (far, middle, and near) as viewed by the second aircraft, according to one embodiment of the positioning system of the present invention, wherein the lighting units indicate that the second aircraft is below the glide slopes required to intercept the in-flight refueling position.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While the positioning system, device, and method embodiments of the present invention are described below in the context of in-flight refueling operations involving a first aircraft 110 (serving as a tanker aircraft) and a second aircraft 120 (serving as a receiver aircraft), it should be understood that the embodiments of the present invention may also be utilized to achieve the relative in-flight spatial positioning of a first and second aircraft for a variety of in-flight operations, including, but not limited to, precision formation flying, relative positioning of aircraft for aerial stunts, formation flying at night or in inclement weather, and other applications requiring in-flight spatial positioning of a first aircraft with respect to a second aircraft. It should also be understood that the embodiments of the present invention may also be utilized to achieve the relative in-flight spatial positioning of a second aircraft with respect to the first aircraft, wherein the second aircraft is a manned aircraft or alternatively, wherein the second aircraft is an unmanned aircraft, such as, for instance, a UAV.

As shown in FIG. 1, a schematic of the in-flight refueling position 130 relative to the boom 114 extending from a first aircraft 110 is shown. Also superimposed on the schematic of FIG. 1 are the disconnect limits 140 and mechanical limits 150 for a boom refueling system. In an in-flight refueling operation, the second aircraft (not shown) must be maneuvered into a position relative to the first aircraft 110 such that a fuel receptacle (not shown) carried by the second aircraft is within the in-flight refueling position 130 relative to the first aircraft 110. While the second aircraft is within the in-flight refueling position 130, a boom operator onboard the first aircraft 110 may safely guide and extend the boom 114 using, for instance, airfoils 118 configured to "fly" the boom 114 into position such that the boom end 116 engages the fuel receptacle and in-flight refueling of the second aircraft may commence. If the second aircraft strays out of the in-flight refueling position 130, it may become necessary to disconnect the boom 114 and boom end 116 from the second aircraft in order to prevent damage to the boom, first aircraft, and/or second aircraft. The in-flight refueling process is typically suspended by a mechanical disconnect of the boom end 116 if the second aircraft's refueling receptacle reaches the disconnect limits 140 shown schematically in FIG. 1. The disconnect limits 140 are typically defined as a safety factor such that the second aircraft does not approach the mechanical limits 150 of the boom refueling system while still engaged with the boom 114. At the mechanical limits 150, if the second aircraft is still attached to the boom 114, the boom refueling system may be damaged and a fuel leak or accident may result. Although the in-flight refueling position 130, disconnect limits 140, and mechanical limits 150 are shown in FIG. 1 relative to a boom refueling system, one skilled in the art will appreciate that the in-flight refueling position, disconnect limits, and mechanical limits shown may also apply to probe and drogue refueling systems. One skilled in the art will also appreciate that the size and position of the in-flight refueling position 130 may vary depending upon the refueling equipment (boom, probe and drogue, or other systems) being used in a particular in-flight refueling operation.

FIG. 2 depicts a schematic of the positioning system according to one embodiment of the present invention including an outline of the signal envelope 200 provided by a positioning device 112. The term "signal envelope" 200 as used herein may be defined as the spatial region, typically to the aft of and below the first aircraft 110, wherein a signal provided by the positioning device 112 is receivable by the operator and/or sensors of the second aircraft 120 so as to guide the second aircraft 120 to the in-flight refueling position 130. More particularly, the positioning device 112 is carried by the first aircraft 110 (serving as, for instance, a tanker aircraft) so as to transmit a signal that is receivable by the second aircraft 120 when the second aircraft 120 is positioned within the signal envelope 200. According to some advantageous embodiments, the positioning device 112 is attached to the first aircraft 110 on a lower surface of a fuselage of the first aircraft so as to provide a signal envelope 200 that extends below and aft of the first aircraft 110 as shown in FIG. 2. In other embodiments, the positioning device 112 may be attached directly to a refueling pod that may further be attached to a wing hardpoint on a first aircraft 110 such that the signal envelope 200 extends below and aft of the refueling pod. In other advantageous embodiments, the positioning device 112 may be positioned either aft or forward of the refueling equipment so as to provide a signal envelope adapted to provide a signal that is receivable by operators and/or sensors of the second aircraft 120. In some embodiments, the positioning device 112 (as further described herein) may be packaged as a removable attachment that may be selectively attached to the first aircraft 110. In other embodiments, the positioning device 112 may be attached in a conformal arrangement with the fuselage of the first aircraft 110 in, for instance, recesses defined by the fuselage of the first aircraft, 110 such that the positioning device 112 creates minimal additional aerodynamic drag or disturbances when the first aircraft 110 is in flight. In other embodiments, the positioning device 112 may be carried by the first aircraft in a variety of positions and configurations such that the signal envelope 200 is adapted to enclose the in-flight refueling position 130 such that the signals receivable by the second aircraft 120 therein may be adapted to guide the second aircraft 120 to the in-flight refueling position 130.

FIG. 2 also shows the center point 230 of the in-flight refueling position as the intersection of a horizontal indicator line 210, defined as the line passing through the boom end 116 parallel to the line defined by connecting the wing tips of the first aircraft 110, and a vertical indicator line 220, defined as the line passing through the boom end 116 perpendicular to the plane defined by the wingspan of the first aircraft 110 and the longitudinal axis of the fuselage of the first aircraft 110. In some embodiments, the positioning device 112 is configured to provide a signal to guide the second aircraft to the center point 230 along a glide path 340 as shown in FIG. 3b.

Also shown in FIG. 2 is the in-flight refueling position 130. In the embodiment shown, the signal envelope 200 of the positioning device 112 is about the same breadth as the in-flight refueling position 130, however, in some other embodiments, the signal envelope 200 in which the signal produced by the positioning device 112 is receivable by the second aircraft 120, may enclose a space that is substantially broader than the in-flight refueling position 130 so as to guide the second aircraft 120 to the in-flight refueling position 130 even as the second aircraft 120 is initially outside of the in-flight refueling position 130. In other embodiments, the signal envelope 200 produced by the positioning device 112 may be configured to have a breadth substantially smaller than the in-flight refueling position 130 so as to decrease the total signal emissions from the positioning device 112. A signal envelope 200 having a narrower breadth may be preferable, for instance, during military in-flight refueling operations occurring in or near hostile airspace wherein the signal emitted from the positioning device 112 may reveal the position of the first aircraft 110 to hostile aircraft or ground-based observers and/or sensors. In other advantageous embodiments, the positioning device 112 may be configured and/or positioned such that the signal envelope 200 produced by the positioning device 112 is adjustable in breadth and strength. Embodiments of the positioning device 112 having an adjustable signal envelope 200 may thus be configurable for both combat situations where low levels of signal emissions are preferred as well as for training situations or in-flight refueling operations in bad weather, wherein the provision of a broad signal envelope 200 may be useful for safely guiding the second aircraft 120, and operators thereof, into the in-flight refueling position 130.

FIGS. 3a and 3b show top and side views, respectively, of an in-flight refueling operation involving a first aircraft 110 and a second aircraft 120. FIGS. 3a and 3b also show the in-flight refueling position 130 and the signal envelope 200 produced by the positioning device 112 according to one embodiment of the positioning system. FIGS. 3a and 3b also show the boom 114, airfoils 118, and boom end 116 that are characteristic of a boom in-fight refueling system. One skilled in the art will appreciate that the in-flight refueling position 130 within the signal envelope 200 of the positioning device 112 and system of the present invention may also be appropriate for guiding the second aircraft 120 to the in-flight refueling position 130 relative to a first aircraft 110 employing a probe and drogue in-flight refueling system.

FIG. 3a also shows a top view of an extended centerline 310 of a fuselage of the first aircraft 110 which serves as a lateral position from which the second aircraft 120 may approach the in-flight refueling zone 130. The in-flight refueling zone may be defined by the signal envelope 200 of the positioning device 112 carried by the first aircraft 110. If the second aircraft 120 approaches the first aircraft 110 along the extended centerline 310 of the first aircraft 110, the second aircraft 120 may more likely avoid turbulence produced by, for instance, the wings, tail, engines, and other control surfaces of the first aircraft 110.

However, as shown in FIG. 3b, in addition to positioning the second aircraft 120 on the extended centerline 310 as shown in FIG. 3a, the operator of the second aircraft 120 may also approach the first aircraft 110 from below and aft along a glide slope 340 that in some embodiments is defined as a downward angle 330 with respect to the extended centerline 310 of the first aircraft 110. In some advantageous embodiments, the positioning system of the present invention is configured to guide the second aircraft 120 to the in-flight refueling position 130 along a glide slope 340 having an angle 330 of about three (3) degrees. If the second aircraft 120 approaches the first aircraft 110 along the glide slope 340 defined by the positioning system according to some embodiments of the present invention, the second aircraft 120 will more likely approach the first aircraft 110 from a position that is below an area of potential turbulence that may be produced by, for instance, the wings, tail, engines, and other control surfaces of the first aircraft 110. Approaching the first aircraft 110 along the glide slope 340 that extends below and aft of the first aircraft 110 may also reduce the possibility that the second aircraft will collide with the tail structure or rear control surfaces of the first aircraft 110.

As shown in FIG. 4, some embodiments of the positioning system may comprise a positioning device 112, carried by a first aircraft 110 that further comprises a transmitter, such as, for instance, a radio transmitter, configured to provide a refueling guidance signal at a selectable frequency such that the refueling guidance signal is adapted to guide a second aircraft 120 to an in-flight refueling position 130 with respect to the first aircraft 110. The transmitter and refueling guidance signal embodiments of the positioning system may also be provided with a receiver device 122, carried by the second aircraft 120. The receiver device may further comprise a receiver, such as for instance, a radio receiver, comprising a frequency selector configured to tune the receiver device to receive the refueling guidance signal at the selectable frequency of the transmitter carried by the first aircraft 110. The transmitter, according to some embodiments, may further comprise a first guiding device 112a configured to guide the second aircraft to a vertical plane coincident with the extended centerline 310 of the fuselage of the first aircraft 110. The first guiding device 112a may be configured to send a refueling guidance signal in, for instance, the VHF frequency range. The transmitter may also further comprise a second guiding device 112b configured to guide the second aircraft upward along a glide slope 340 extending below and aft of the first aircraft 110. The second guiding device 112b may be configured to send a signal in, for instance, the UHF frequency range. Thus, the refueling guidance signals provided by the first and second guiding devices 112a, 112b may be used to provide both lateral positioning and glide slope signals adapted to be received by the receiver device 122 carried by the second aircraft 120. As such, the refueling guidance signal embodiments of the positioning system described above may be adapted to guide the second aircraft 120 to the in-flight refueling position 130 without the need for the operator and/or sensors of the second aircraft 120 to be in visual contact with the first aircraft 110. In addition, the refueling guidance signals, such as, for instance, radio signals, may provide a signal envelope 200 that extends further aft of the first aircraft 110 than other signals that may be produced by visible light sources, as according to other embodiments of the positioning system. Thus the refueling guidance signal embodiments of the positioning system may be utilized to guide the second aircraft 120 to the in-flight refueling position 130 once the second aircraft enters the relatively broad signal envelope 200 provided by the first and second guiding devices 112a-b. Also, while in some embodiments, the first and second guiding devices 112a-b may be discrete components carried by the first aircraft 110, they may also be provided together and/or co-located in or on the first aircraft 110.

As described above, a refueling guidance signal or signals produced by, for instance, the first and second guiding devices 112a-b, may be detectable by the receiver device 122 carried by the second aircraft 120 after the second aircraft has entered the signal envelope 200 of the positioning system. In some embodiments, the receiver device 122 carried by the second aircraft 120 may be further configured to manipulate the refueling guidance signal so as to provide visual indicia in response to the refueling guidance signal, wherein the visual indicia are adapted to be viewed by an operator of the second aircraft 120 via, for instance, a display 410 as shown in FIGS. 4a-c. In some embodiments, the receiver 122 may further comprise a display 410 for providing the visual indicia described above. In some advantageous embodiments, an instrument landing system (ILS) receiver, for instance, may serve as the receiver device 122, such that the operator of the second aircraft 120 may tune the ILS receiver to the selectable frequency or frequencies at which the first and second guiding devices 112a, 112b are configured to provide their respective refueling guidance signals. However, wherein ILS radio signals may be adapted to guide an aircraft along a downward glide slope to a fixed runway, the refueling guidance signal or signals provided by the guiding devices 112a, 112b according to refueling guidance signal embodiments of the present invention, may be adapted to guide the second aircraft 120 to the in-flight refueling position 130 relative to the first aircraft 110.

FIGS. 4a–c show the display 410 of a receiver device 122 carried by the second aircraft that is configured to receive refueling guidance signals from the first and second guiding devices 112a, 112b. The display 410 may be further configured to provide visual indicia 420, 430 in response to the refueling guidance signals, such that the visual indicia are adapted to be received by the receiver device 122 when the second aircraft is positioned within the signal envelope 200 of the positioning system. The display 410 may be configured to provide vertical and horizontal baselines, 440 and 450 respectively, with respect to which the visual indicia 420, 430 may be positioned to advise the operator and/or sensors of the second aircraft 120 to guide the second aircraft 120 to the in-flight refueling position 130.

As shown in FIGS. 4a–4c, the vertical and horizontal baselines, 440, 450, respectively, show the current vertical and horizontal position of the second aircraft with respect to the position required to intercept the in-flight refueling position 130. Thus, the visual indicia 420, 430 indicate the required vertical and horizontal positions of the second aircraft with respect to the position required to intercept the in-flight refueling position 130. As such, the position of the visual indicia 420, 430 with respect to the vertical and horizontal baselines 440, 450 also advise the operator of the second aircraft as to the vertical and horizontal positions to which the operator should guide the second aircraft in order to intercept the in-flight refueling position 130.

Referring to FIGS. 4 and 4a, the visual indicia 420, 430 provided by the display 410 may further comprise, for instance, a lateral visual indicia 420 configured to advise the operator and/or sensors of the second aircraft 120 to guide the second aircraft 120 to a vertical plane coincident with the extended centerline 310 of the first aircraft. The visual indicia may also further comprise, for instance, a glide slope visual indicia 430 configured to advise the operator and/or sensors of the second aircraft 120 to guide the second aircraft 120 along a glide slope 340 having an angle 330 extending below and aft of the first aircraft 110. The visual indicia 420, 430 provided by the display 410 may be configured to advise the operator and/or sensors of the second aircraft 120 to guide the second aircraft to an in-flight refueling position 130 relative to the first aircraft 110 as described in the examples described below.

First, as shown in FIG. 4a, the lateral visual indicia 420 may be positioned left of the vertical baseline 440 such that the display 410 is adapted to advise the operator and/or sensors of the second aircraft 120 to guide the second aircraft 120 to the left to intercept the vertical plane coincident with the extended centerline 310 of the first aircraft 110. Also, as shown in FIG. 4a, the glide slope visual indicia 430 may be positioned below the horizontal baseline 450 such that the display 410 is adapted to advise the pilot and/or sensors of the second aircraft 120 to guide the second aircraft 120 downward to intercept the glide slope 340 required to safely approach the first aircraft 110 from the rear and aft.

Second, as shown in FIG. 4b, the lateral visual indicia 420 may be positioned right of the vertical baseline 440 such that the display 410 is adapted to advise the operator and/or sensors of the second aircraft 120 to guide the second aircraft 120 to the right to intercept the vertical plane coincident with the extended centerline 310 of the first aircraft 110. Also, as shown in FIG. 4b, the glide slope visual indicia 430 may be positioned above the horizontal baseline 450 such that the display 410 is adapted to advise the operator and/or sensors of the second aircraft 120 to guide the second aircraft 120 upward to intercept the glide slope 340 required to safely approach the first aircraft 110 from the rear and aft.

Finally, as shown in FIG. 4c, the lateral visual indicia 420 may be aligned with the vertical baseline 440 and the glide slope visual indicia 430 may be aligned with the horizontal baseline 450 such that the display 410 is adapted to inform the operator and/or sensors of the second aircraft 120 that the second aircraft is both: (1) aligned laterally with the extended centerline 310 of the first aircraft 110, and (2) ascending toward the center point 230 of the in-flight refueling position 130 defined by the boom end 116 along the glide slope 340.

Thus, using the refueling guidance signal embodiments of the present invention, second aircraft 120 may be guided to the in-flight refueling position 130 along a glide slope 340 and laterally aligned with the extended centerline 310 of the first aircraft 110 without the operator and/or sensors of the second aircraft having visual contact with the first aircraft 110. For such "blind" or "instrument-only" approaches to the in-flight refueling position 130, it may also be advantageous to provide a third guiding device 112c positioned, for instance, on the boom end 116 for emitting a refueling guidance signal to inform the operator and/or sensors (via, for instance, a numerical display, in feet) of the range from the second aircraft 120 to the boom end 116 extending from the first aircraft 110. The provision for a third guiding device 112c may be advantageous in avoiding collisions, for instance, between the second aircraft 120 and the boom end 116 extending from the first aircraft 110 during in-flight refueling operations wherein the second aircraft 120 is executing a "blind" approach to the in-flight refueling position 130.

The refueling guidance signals provided by the positioning device 112 according to the refueling guidance signal embodiments of the positioning system may be further interpreted in other ways by, for instance, a receiver device 122 carried by the second aircraft 120. For instance, the receiver device may provide lighting indicia, audible voice instructions, and/or other types of visual and aural indicia to advise the operator and/or sensors of the second aircraft 120 to guide the second aircraft 120 to the in-flight refueling position 130.

As shown in FIG. 5 some embodiments of the positioning system comprise a positioning device 112 carried by a first aircraft 110 configured to produce a signal that further provides a visual indicia adapted to be viewed by the operator and/or sensors of the second aircraft 120. According to the embodiments shown in FIGS. 5 and 6, the positioning device 112 further comprises lighting units 112d–f that are configured to provide the visual indicia to guide the second aircraft 120 along a glide slope 340 (see FIG. 3b) extending below and aft of the first aircraft 110. Although the lighting units 112d–f shown do not provide a signal for lateral positioning of the second aircraft with respect to the extended centerline 310 of the first aircraft 110 (see FIG. 3a) it should be understood that additional lighting units could be utilized to provide a signal for lateral positioning of the second aircraft 110 relative to the extended centerline 310 of the first aircraft 110. One skilled in the art will appreciate, however, that operators and/or sensors of the second aircraft 120 that receive a visual indicia from the lighting units 112d–f as shown in the embodiments of FIGS. 5–6 will also be in visual contact with the approximate extended centerline 310 of the first aircraft 110 as the lighting units 112d–f of the embodiments shown are carried by the first aircraft 110 along the approximate centerline of the first aircraft's 110 lower fuselage as shown in FIGS. 5–6. Also, the lighting units 112d–f utilized in embodiments of the present invention may be further configured to produce visible light and/or varying wavelengths of non-visible energy, such as infra-red emissions and/or UV emissions that may be received by operators and/or sensors of the second aircraft equipped with, for instance, night-vision equipment, IR-sensitive sensors or optics, and/or UV-sensitive sensors or optics. Thus, as used herein, the term "visual indicia" should be interpreted to include signals provided in spectra outside the visual spectrum that may be visible to operators and/or sensors equipped with sighting equipment configured to convert such signals into visible indicia that lie within the visible spectrum.

FIGS. 5a–5c show an embodiment of the positioning system of the present invention wherein the positioning device 112 comprises light units 112d, 112f that are configured to provide a signal further comprising visual indicia, such as, for instance, colored lights, in order to advise the operator and/or sensors of the second aircraft 120 to guide the second aircraft 120 within the in-flight refueling position 130. In advantageous embodiments the lighting units 112d, 112f may be further configured to project a beam of visible light comprising, for instance, a red segment in the upper part of the beam and a white segment in the lower part of the beam, such that the pilot and/or optical sensors onboard the second aircraft 120 will perceive a red or white light depending on the position of the second aircraft 120 with respect to the lighting units 112d, 112f carried by the first aircraft 110. In some advantageous embodiments, the visual positioning system may include two or more lighting units 112, including a near lighting unit 112d, and a far lighting unit 112f such that the second aircraft 120 is provided with visual indicia from the lighting units 112d, 112f in order to guide the second aircraft 120 along a glide slope 340 (see, for instance FIG. 4) such that the second aircraft 120 intercepts the in-flight refueling position 130. Preferably, the far lighting unit 112f is mounted forward of the near lighting unit 112d along the underside of the first aircraft 110 as shown, for instance in FIG. 5. According to this embodiment, the pilot and/or optical sensors of the second aircraft 120 may not perceive the visual indicia emitted from the lighting units 112d, 112f until the second aircraft 120 has entered the signal envelope 200 shown in FIG. 2. Upon entering the signal envelope 200 the pilot and/or optical sensors onboard the second aircraft 120 may receive visual indicia such as, for instance, visible light emitted from the lighting units 112d, 112f. According to some embodiments such as that shown in FIGS. 5a–5c, the visible light emitted from the lighting units 112d, 112f may appear red or white depending on the position of the second aircraft 120 relative to the glide slope 340 suggested to safely intercept the in-flight refueling position 130. More specifically, FIGS. 5a–5c show the lighting units 112d, f as seen from the second aircraft 120 approaching the first aircraft 110 from within the signal envelope 200 from several different angular positions.

First, FIG. 5a shows the appearance of red visible light being emitted from both the near 112d and far 112f lighting units, indicating to the operator and/or sensors of the second aircraft 120 that the second aircraft 120 is positioned above the glide slope 340 that is outlined for safely intercepting the in-flight refueling zone 130. The appearance of red visible light is due to the split visible light beam configuration of the lighting units 112d, f according to some advantageous embodiments of the positioning system, wherein the visible light emitted from the lighting units further comprises a red segment in the upper part of the visible light beam and a white segment in the lower part of the visible light beam.

Second, FIG. 5b shows the appearance of white visible light emitted from the near lighting unit 112d and red visible light emitted from the far lighting unit 112f, indicating that the second aircraft 120 is positioned on the glide slope 340 that is optimal for safely intercepting the in-flight refueling zone 130. This lighting configuration is receivable by the operator and/or sensors of the second aircraft 120 only when the second aircraft is positioned so as to receive the lower white visible light from the near lighting unit 112d and the higher red visible light from the far lighting unit 112f.

Finally, FIG. 5c shows the appearance of white visible light emitted from both the near and far lighting units 112d, 112f, indicating that the second aircraft 120 is positioned below the glide slope 340 that is optimal for safely intercepting the in-flight refueling zone 130. The appearance of white visible light is due to the split visible light beam configuration of the lighting units 112d, f according to some advantageous embodiments of the positioning system, wherein the visible light emitted from the lighting units further comprises a red segment in the upper part of the visible light beam and a white segment in the lower part of the visible light beam.

FIG. 6 shows another possible embodiment of the positioning system of the present invention wherein the positioning device further comprises three lighting units 112d, 112e, 112f that are configured to provide a signal further comprising visual indicia, such as, for instance, colored lights, in order to advise the operator and/or sensors onboard the second aircraft 120 to guide the second aircraft 120 to within the in-flight refueling position 130. In the embodiment shown in FIG. 6, the positioning device 112 further comprises three lighting units 112d–f so as to provide more precise glide slope information such as, for instance, whether the second aircraft 120 is approaching the in-flight refueling position along a low or high glide slope 340. In this instance, instead of a single glide slope 340, the lighting units 112d–f may provide multiple glide slopes wherein each different glide slope may be suitable for use in-flight refueling operations involving second aircraft 120 having a refueling receptacle located in various positions relative to the position of the operator and/or sensors of the second aircraft 120. As shown in FIG. 6, the lighting units 112d–f may be carried by the first aircraft along the centerline of the fuselage of the first aircraft 110 so as to provide visual indicia to the operator and/or sensors of the second aircraft 120 when the second aircraft 120 is positioned within the signal envelope 200 of the positioning system.

As shown in some previous embodiments, the positioning device may further comprise near and far lighting units 112d and 112f, respectively. Other embodiments of the positioning system, such as that shown in FIGS. 6a–6d may add, for instance, a third, middle lighting unit 112e which increases the complexity of the glide slope information that may be provided by the positioning device 112 to the operator and/or sensors of the second aircraft 120 by providing, for instance, two possible glide slope paths to intercept the in-flight refueling position 130. Also, the lighting units 112d,e,f may be further configured, as described above, to project a beam of visible light comprising, for instance, a red segment in the upper part of the beam and a white segment in the lower part of the beam, such that the pilot and/or optical sensors onboard the second aircraft 120 may perceive a red or white light depending on the position of the second aircraft 120 with respect to the lighting units 112d,e,f carried by the first aircraft 110.

FIG. 6a shows red visible light being emitted from the near 112d, middle 112e, and far 112f lighting units, indicating that the second aircraft 120 is positioned above any possible glide slope 340 for safely intercepting the in-flight refueling zone 130. The red visible light visible from all three lighting units 112e–f may indicate to the operator and/or sensors of the second aircraft 120 that the second aircraft 120 is positioned too high with respect to the first aircraft 110 and may be in danger of encountering turbulence from the control surfaces of the first aircraft 110 and/or colliding with, for instance, the tail section of the first aircraft 110. The appearance of red visible light is due to the split visible light beam configuration of the lighting units 112d, e, f according to some advantageous embodiments of the positioning system, wherein the visible light emitted from the lighting units further comprises a red segment in the upper part of the visible light beam and a white segment in the lower part of the visible light beam.

FIG. 6b shows the appearance of white visible light emitted from the near lighting unit 112d and red visible light emitted from the middle and far lighting units 112e and 112f, respectively, indicating that the second aircraft 120 is positioned on an upper glide slope 340 that is appropriate, and slightly high, for safely intercepting the in-flight refueling zone 130. This lighting configuration is receivable by the operator and/or sensors of the second aircraft 120 only when the second aircraft is positioned so as to receive the lower white visible light from the near lighting unit 112d and the higher red visible light from the middle and far lighting units 112e and 112f. The approach path indicated by the lighting units 112d–f shown in FIG. 6b may be appropriate for, for instance, a second aircraft 120 having an in-flight fueling receptacle (or probe, in the case of probe and drogue embodiments) that is located forward and below the area where the operator and/or sensors of the second aircraft 120 are located.

FIG. 6c shows the appearance of white visible light emitted from the near and middle lighting units 112d and 112e, respectively, and red visible light emitted from the far lighting unit 112f, indicating that the second aircraft 120 is positioned on a lower glide slope 340 that is appropriate, and slightly low, for safely intercepting the in-flight refueling zone 130. This lighting configuration is receivable by the operator and/or sensors of the second aircraft 120 only when the second aircraft is positioned so as to receive the lower white visible light from the near and middle lighting units 112d and 112e and the higher red visible light from the far lighting unit 112f. The approach path indicated by the lighting units 112d–f shown in FIG. 6b may be appropriate for, for instance, a second aircraft 120 having an in-flight fueling receptacle (or probe, in the case of probe and drogue embodiments) that is located above and behind the area where the operator and/or sensors of the second aircraft 120 are located.

FIG. 6d shows white visible light being emitted from the near 112d, middle 112e, and far 112f lighting units, indicating that the second aircraft 120 is positioned below any possible glide slope 340 for intercepting the in-flight refueling zone 130. The white visible light visible from all three lighting units 112e–f may indicate to the operator and/or sensors of the second aircraft 120 that the second aircraft 120 is positioned too low to intercept the in-flight refueling position 130 and to properly engage, for instance, the boom 114 or hose and drogue, of the first aircraft 110.

According to other advantageous embodiments, the positioning device 112 may further comprise a lighting unit wherein the visible light emitted from the lighting unit further comprises, for instance, a triple split beam arrangement as follows: a red segment in the upper part of the visible light beam, a green segment in the center part of the visible light beam, and an amber segment in the lower part of the visible light beam. In this embodiment, the positioning device 112 may be carried by the first aircraft 110 such that the visible light emitted from the lighting unit is receivable by the second aircraft when it is positioned within the signal envelope 200 of the lighting unit. Further, in this embodiment, the operator and/or sensors of the second aircraft may perceive, for instance: (1) a red visible light emitted from the lighting unit if the second aircraft is positioned above the glide slope 340 defined to intercept the in-flight refueling position 130, (2) a green visible light emitted from the lighting unit is the second aircraft is on the glide slope 340 defined to intercept the in-flight refueling position 130, or (3) an amber visible light emitted from the lighting unit if the second aircraft is positioned below the glide slope 340 defined to intercept the in-flight refueling position 130.

In other advantageous embodiments, the positioning system may comprise a positioning device 112 configured to produce visible light of a single color, that, for instance, appears to pulsate at varying frequencies depending on the relative position of the second aircraft 120 with respect to the glide slope 340 defined to intercept the in-flight refueling position, so that the second aircraft 120 may be guided to the recommended glide slope 340 in response to the pulsating visible light signal.

Further, according to some advantageous embodiments of the positioning system of the present invention, the positioning device 112 may comprise both the transmitter (including first, second, and third guiding devices 112a–c) as well as the lighting units 112e–f in order to provide a plurality of signal types adapted to be received by the second aircraft 120 in order to guide the second aircraft to the in-flight refueling position 130 relative to the first aircraft 110.

For instance, the guiding devices 112a–c of the refueling guidance transmitter according to one embodiment of the positioning system, may be provided with a broader and longer range signal envelope such that the guiding devices 112a–c are adapted to guide the second aircraft 120 towards the in-flight refueling position 130 even if the first and second aircraft 110, 120 are separated by, for instance, a weather pattern or natural light condition that obscures visibility between the two aircraft. The lateral and glide slope signals provided by the first and second guiding devices 112a, 112b respectively, may be received by the second aircraft to execute a "blind" or "instrument" approach to the in-flight refueling position relative to the first aircraft 110 using for instance, the receiver device 122 and associated display 410 carried by the second aircraft 120.

As the second aircraft approaches the IFRP 130 using the refueling guidance signals emitted by the guiding devices 112a–c visibility between the first and second aircraft may be restored such that the operator and/or sensors of the second aircraft 120 may receive visible light from the lighting units 112e–f carried by the first aircraft 110. Once the lighting units 112e–f are visible to the second aircraft 120 (which may occur, for instance, as the second aircraft enters the generally smaller signal envelope 200 of the lighting units 112e–f) the lighting units are adapted to guide the second aircraft along a glide slope 340 to safely intercept the in-flight refueling zone 130 and subsequently safely engage the boom end 116 to commence in-flight refueling operations (or in alternate embodiments, the drogue to commence in-flight refueling operations).

Referring again to FIGS. 3*a*–3*b* a method for facilitating in-flight spatial positioning of a first aircraft 110 with respect to a second aircraft 120 is described. One step comprises sending a signal from a positioning device 112 carried by the first aircraft 110, wherein the positioning device 112 is further configured such that the signal is adapted to be receivable by the second aircraft 120. An additional step comprises guiding the second aircraft 120, in response to the signal, to an in-flight refueling position 130 relative to the first aircraft 110. According to other embodiments of the method of the present invention, the operator of the second aircraft 120 may receive the signal and be advised to guide the second aircraft 120 to the in-flight refueling position 130.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A positioning system adapted to facilitate in-flight spatial positioning of a first aircraft with respect to a second aircraft, the positioning system comprising:
    a transmitter carried by the first aircraft and configured to wirelessly provide a radio signal receivable by the second aircraft, the transmitter being further configured such that the radio signal is adapted to define a signal envelope that contains an in-flight refueling position, so as to guide the second aircraft to the in-flight refueling position relative to the first aircraft, the transmitter comprising:
        a first guiding device configured to provide a first radio signal component in a first frequency range defining a vertical plane coincident with a predefined portion of the first aircraft, the first guiding device being further configured to provide a signal defining a lateral position of the second aircraft relative to the vertical plane; and
        a second guiding device configured to provide a second radio signal component in a second frequency range defining a glide slope extending below and aft of the first aircraft, the second guiding device being further configured to provide a signal defining a vertical position of the second aircraft relative to the glide slope.

2. A positioning system according to claim 1, further comprising a receiver device carried by the second aircraft, the receiver device being configured to be responsive to the radio signal so as to guide the second aircraft to the in-flight refueling position.

3. A positioning system according to claim 2, wherein the transmitter is configured to provide the radio signal at a selectable frequency and wherein the receiver device comprises a receiver comprising a frequency selector configured to tune the receiver device to receive the radio signal at the selectable frequency.

4. A positioning system according to claim 1, wherein the second guiding device is further configured to provide a glide slope that extends about three degrees down from the centerline of the fuselage of the first aircraft.

5. A positioning system according to claim 1, wherein the receiver device is configured to manipulate the radio signal so as to provide a visual indicia in response to the radio signal, and wherein the receiver device further comprises a display such that the visual indicia is adapted to be viewed by an operator of the second aircraft so as to advice the operator to guide the second aircraft to the in-flight refueling position.

6. A positioning system according to claim 1, further comprising at least one lighting device for generating a visual indicia adapted to be viewed by an operator of the second aircraft so as to advice the operator to guide the second aircraft to the in-flight refueling position.

7. A positioning system according to claim 6, wherein the at least one lighting device further comprises a split-beam lighting device, the split-beam lighting device being configured to provide color-coded visual indicia adapted to be viewed by an operator of the second aircraft so as to advice the operator to guide the second aircraft to the in-flight refueling position.

8. A positioning device adapted to facilitate in-flight spatial positioning of a first aircraft with respect to a second aircraft, the positioning device being carried by the first aircraft and comprising:
    a transmitter configured to provide a radio guidance signal, the radio guidance signal being adapted to be received by the second aircraft, the transmitter being further configured such that the radio guidance signal is adapted to define a signal envelope that contains an in-flight refueling position, so as to guide the second aircraft to the in-flight refueling position relative to the first aircraft, the transmitter comprising:
        a first guiding device configured to provide a first radio signal component in a first frequency range defining a vertical plane coincident with a predefined portion of the first aircraft, the first guiding device being further configured to provide a signal defining a lateral position of the second aircraft relative to the vertical plane; and
        a second guiding device configured to provide a second radio signal component in a second frequency range defining a glide slope extending below and aft of a rear portion of the fuselage of the first aircraft, the second guiding device being further configured to provide a signal defining a vertical position of the second aircraft relative to the glide slope.

9. A positioning device according to claim 8, wherein the second guiding device is further configured to provide a glide slope that extends about three degrees down from the centerline of the fuselage of the first aircraft.

10. A positioning device according to claim 8, wherein the transmitter is further configured to provide the radio guidance signal at a selectable frequency.

11. A method for facilitating in-flight spatial positioning of a first aircraft with respect to a second aircraft, the method comprising:
    transmitting a lateral positioning radio signal in a first frequency range defining a vertical plane coincident with a predefined portion of the first aircraft, the lateral positioning radio signal also defining a lateral position of the second aircraft relative to the vertical plane; and
    transmitting a glide slope positioning radio signal in a second frequency range defining a glide slope extending below and aft of a rear portion of the fuselage of the first aircraft, the glide slope positioning radio signal also defining a vertical position of the second aircraft relative to the glide slope;
receiving the lateral positioning radio signal and the glide slope positioning radio signal at the second aircraft; and
guiding the second aircraft, in response to the lateral positioning radio signal and the glide slope positioning radio signal, to the in-flight refueling position relative to the first aircraft.

12. A method according to claim 11, further comprising transmitting visible light from a lighting device carried by the first aircraft.

13. A method according to claim 11, further comprising transmitting color-coded visual indicia from a split-beam lighting device carried by the first aircraft.

* * * * *

UNITED STATES PATENT AND TRADEMARK OFFICE
CERTIFICATE OF CORRECTION

| | | |
|---|---|---|
| PATENT NO. | : 7,093,801 B2 | Page 1 of 1 |
| APPLICATION NO. | : 10/857226 | |
| DATED | : August 22, 2006 | |
| INVENTOR(S) | : Schroeder | |

It is certified that error appears in the above-identified patent and that said Letters Patent is hereby corrected as shown below:

<u>Column 16,</u>

Lines 8, 14 and 20, "advice" should read --advise--;

Signed and Sealed this

Nineteenth Day of December, 2006

JON W. DUDAS
*Director of the United States Patent and Trademark Office*